May 29, 1923.

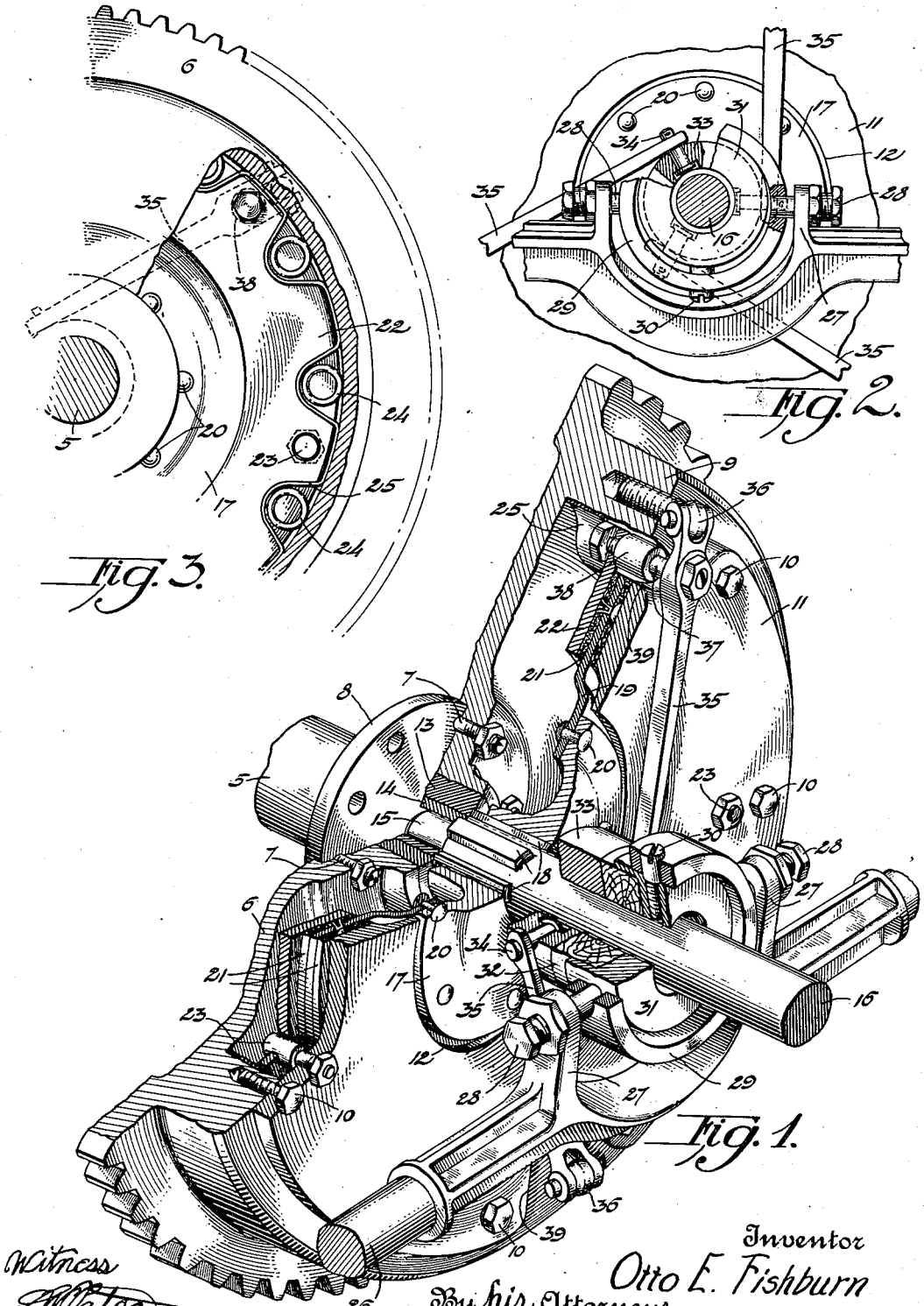

O. E. FISHBURN 1,457,221

DRY PLATE CLUTCH

Filed Jan. 20, 1921    2 Sheets-Sheet 2

Inventor
Otto E. Fishburn
By his Attorneys
Blackmore Spencer & Pliny

Patented May 29, 1923.

1,457,221

UNITED STATES PATENT OFFICE.

OTTO E. FISHBURN, OF NEW YORK, N. Y., ASSIGNOR TO GENERAL MOTORS CORPORATION, OF DETROIT, MICHIGAN, A CORPORATION OF DELAWARE.

DRY-PLATE CLUTCH.

Application filed January 20, 1921. Serial No. 438,690.

*To all whom it may concern:*

Be it known that I, OTTO E. FISHBURN, a citizen of the United States, and a resident of New York, county of New York, and State of New York, have invented certain new and useful Improvements in Dry-Plate Clutches, of which the following is a full, clear, concise, and exact description, such as will enable others skilled in the art to which the invention relates to make and use the same, reference being made therein to the accompanying drawings, which form a part of this specification.

The invention relates to clutch construction of the type generally designated as a "dry plate" clutch, and while of general applicability, it is more especially designed for transmitting power from an automobile engine to the main drive shaft whereby the vehicle wheels are actuated.

The object of the invention is to provide a clutch of high efficiency and great durability and compactness which shall require no application of lubricant while in use, and which may be manufactured and assembled easily and at relatively low cost.

A further object is to provide a friction clutch in which the frictional engagement shall take place gradually as the clutch goes into operation thereby contributing to the smoothness of transmission of power.

With the above and other objects in view, as will appear more fully from the following description, the invention comprises the features of novelty herein disclosed, together with such modifications and variations as may be included within the scope of the appended claims.

In the accompanying drawings, in which is illustrated one embodiment of the invention, Fig. 1 is a perspective view, partly in section, showing a clutch and related parts;

Fig. 2 is an elevation, partly in section, showing the clutch operating mechanism as viewed from the right of Fig. 1;

Fig. 3 is an elevation, partly in section, showing the clutch structure as viewed from the left of Fig. 1.

Figure 4:
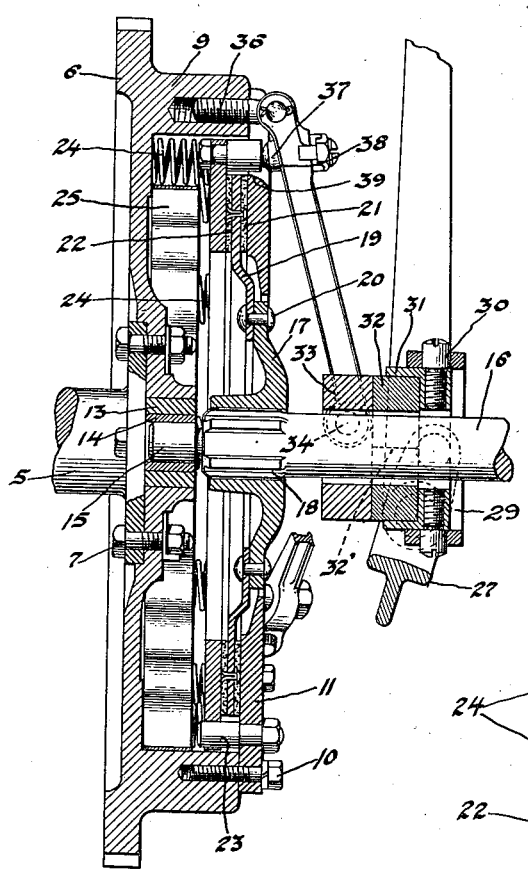
Fig. 4 is a vertical sectional view of the clutch.

Referring to the drawings, 5 indicates a shaft which, for purposes of description, will be referred to herein as a driving shaft, and which may be the engine or crank shaft of an internal combustion engine. 6 designates a clutch casing member which is illustrated as being so constructed that it serves also the purpose of a flywheel, and which, together with suitable driving means, as the shaft 5, may be regarded as a driving member. This member may be secured to the shaft 5 in any suitable manner as by bolts 7 passing through apertures in the member and in the flange 8 on the shaft.

The casing member or flywheel 6 is provided with an annular flange 9 adjacent its periphery to which is secured, as by bolts 10, a combined cover and friction plate 11, thus forming a partially enclosed chamber in which parts of the clutch mechanism may be housed. The plate 11 may have the central portion cut away, if desired, as indicated at 12.

At the center of the casing member or flywheel 6 is a bearing sleeve 13, within which is mounted a bushing 14 of suitable anti-friction or oil-less bearing material. In this bearing is supported the reduced end 15 of the shaft 16 which is referred to herein as the driven shaft and may be the main drive or transmission shaft of an automobile. Upon the shaft 16 is mounted the clutch hub 17 which is permitted to slide on the shaft but is caused to rotate therewith by splined engagement as indicated at 18. The hub 17 carries a clutch plate 19 which may be of pressed metal secured to the hub by rivets 20. The clutch plate is preferably faced with any suitable friction material such as brake lining material indicated at 21. The clutch plate, together with any suitable driven mechanism connected to rotate therewith, as the shaft 16, may be regarded as a driven member.

Between the clutch plate 19 and the inner face of the casing member 6 is the pressure ring 22 which is slidably supported upon pins 23 secured, as shown, to the cover 11 and extending through apertures in the ring. The pressure ring is normally forced toward the clutch plate and the latter toward the cover plate 11 by springs 24 which are suitably spaced around the periphery of the chamber formed in the casing member 6, being held in position by a strip of sheet metal 25 shaped to operate as a spring retainer and spacer. It will be understood that when the springs 24 are permitted to operate freely upon the pressure ring 22, the friction surfaces of the clutch plate 19 are gripped between the pressure ring and the cover plate 11, thus causing the parts to rotate together and transmitting motion from one shaft to the other.

The clutch-releasing means which I prefer to employ comprises a rock shaft 26 which is suitably supported and may be arranged to be actuated by any usual or convenient form of clutch-releasing device such as a clutch pedal. Mounted upon or formed integral with the rock shaft are the yoke members 27 carrying trunnions 28 upon which is supported the trunnion ring 29. Two trunnions 30 carried by the ring 29 and spaced at angles of 90° from the trunnions 28 support the retainer ring 31 in a recess in which is the annular body of bearing material 32 which may be split as indicated at 32′ to facilitate insertion or removal. This insert of bearing material may be of wood suitably impregnated with lubricant.

An operating ring 33 adjacent the bearing insert 32 and adapted to be engaged thereby when the clutch is to be released is supported upon pins 34 mounted upon the inner ends of the clutch levers 35. The outer ends of the levers 35 are pivotally supported upon the casing member or flywheel 6 as by studs 36 shown as screw-threaded in apertures in the flywheel rim. Upon the clutch levers and near the points of pivotal support of the same are secured the operating pins 37 adapted to engage loosely with the ends of studs 38 mounted upon the pressure ring 22 outside of the periphery of the clutch plate 19 and extending through cutaway portions 39 of the cover plate 11.

Figure 5:
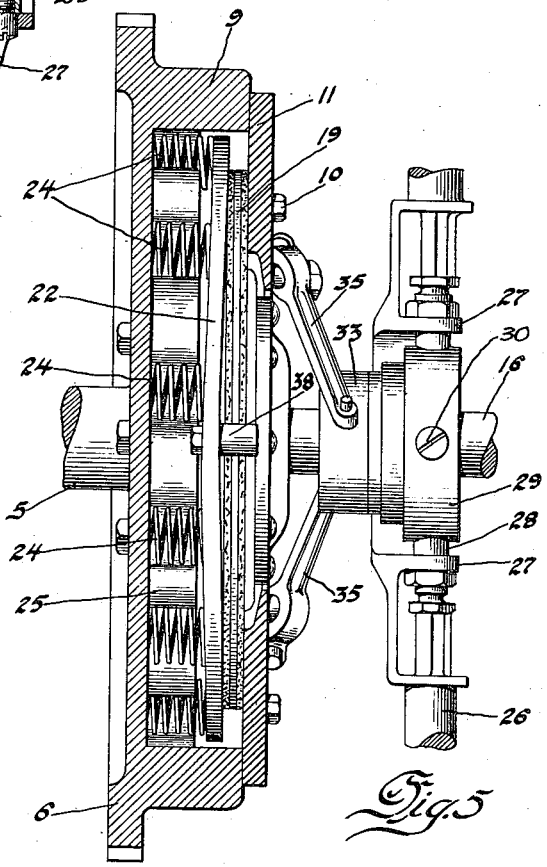
Fig. 5 is an elevation with parts broken away illustrating the distortion of the clutch pressure ring.

The studs 38, which are three in number in the embodiment illustrated, corresponding to the three levers 35 as shown in Fig. 2, will be spaced about the periphery of the pressure ring at equal intervals, and the springs 24 will be of such number and so located as to operate upon the pressure ring at points intermediate the locations of the studs. Furthermore, the ring 22 is preferably to be constituted of sufficiently yielding or flexible material to permit it to be flexed somewhat under the influence of the pressure exerted upon the studs 38. Hence the movement of the parts to release the clutch will cause the springs most closely adjacent to the studs 38 to be compressed slightly more than those more remote as shown upon an exaggerated scale for purpose of illustration in Fig. 5. Upon the reversal of the movement the points of the ring where the springs are compressed the least will be first to engage the clutch plate, and full engagement will not take place until the clutch levers have been fully released. In other words, referring to the structure shown in Figs. 3, 4 and 5 application of pressure to the stud 38 will cause the ring 22 to be slightly bent or distorted and will compress the springs 24 immediately adjacent to the stud to a somewhat greater extent than those adjacent the guide pin 23, which latter is approximately equidistant between two of the studs 38. As a result the clutch may be "eased in" and the driven part may be brought up to the speed of the driving part much more smoothly than would be possible were all of the friction surfaces allowed to engage simultaneously.

The retainer 31, bearing insert 32, and operating collar 33 are all spaced away from the driven shaft and are intended never to contact with it in operation, the collar 33 being suspended from the levers 35 and the retainer 31 being supported upon the trunnions 30 and trunnion ring 29. The trunnions 28 and 30, shown as screw-threaded to provide for adjustment, permit the retainer to be properly positioned, out of contact with the shaft, notwithstanding a possible inaccuracy in the relative positions of the shaft and the clutch yoke.

It will be noted that, when the clutch is fully engaged, there are no relatively rotating parts with engaging surfaces, provided the bearing insert 32 is out of contact with the collar 33 as may be insured by a slight extent of lost motion in the clutch-operating connections. When the clutch is released or partially released a small amount of wear will occur on the bearing members 14 and 32, chiefly on the latter. These bearings will last almost indefinitely in practice, especially as the pressure required to release the clutch is greatly reduced by the mounting of the levers with the fulcrum at the outer end and extending their inner ends to connect with the operating collar at a tangent to the periphery of the latter, thus securing the greatest leverage possible within given dimensions. The bearing member 32, however, in case of necessity, may be very readily and cheaply renewed, the retainer ring 31 being removable merely by withdrawal of the screw trunnions 30.

The clutch hub is so proportioned as to be closely adjacent to the cover ring 11, so that only a very small space intervenes through which foreign matter might enter the interior of the casing. Such matter as may find entrance, however, is readily discharged at the periphery of the chamber through the openings 39, whereby the clutch is rendered self-cleaning.

It will be seen that the construction is particularly simple and compact, requires a minimum of accurate machining operations, and is readily accessible for assembling or disassembling. Since the clutch is connected to the driven shaft by a splined connection only, the entire clutch may be assembled as a whole and the shaft be placed in position afterward. The elimination of all necessity for lubrication while in use is also regarded as a valuable feature.

Various changes in details of construction may be made without departing from the scope of the invention or sacrificing its advantages, and, therefore, I do not wish to be limited to the specific structure above described.

I claim:

1. In a clutch, the combination of driving and driven members having respectively friction surfaces adapted to be brought into engagement, one of said members being flexible, operating means adapted to cause bending of said flexible member when the said means is actuated to disengage the clutch surfaces, and means for engaging said members whereby portions of said friction surfaces are brought into contact previous to the contacting of other portions thereof.

2. In a clutch, the combination of a flexible driving member having a friction surface, a driven member having a friction surface adapted to contact with the surface of the driving member, means for joining said members together, and means for disengaging said members adapted to cause distortion of said flexible member whereby portions of said friction surfaces are permitted to be forced into driving engagement previous to the engagement of other portions thereof.

3. In a clutch, driving and driven members having respectively friction surfaces adapted to be brought into engagement, one of said members being flexible, spring means for forcing said members into engagement, and operating means for separating said members, said operating means arranged to cause bending of said flexible member as said surfaces are separated.

4. In a clutch, the combination of a driving member, a driven member adapted to be brought into frictional engagement with said driving member, one of said members comprising a flexible plate, spring means for forcing said plate toward the cooperating friction member, and operating means adapted to act in opposition to said spring means and arranged to distort said plate whereby portions of said spring means are acted upon to a greater extent than other portions thereof.

5. In a clutch, a casing member, a cover plate fixed thereto, a clutch plate mounted within said casing member, a flexible pressure ring, a series of springs within said casing member operative to force said ring into engagement with said clutch plate and the latter into engagement with said cover plate, and operating means adapted to act upon said ring at intervals and thereby bend the same permitting pressure to be applied to portions only of said clutch plate as the clutch surfaces are brought into engagement.

6. In a clutch, the combination of a driving shaft, a driven shaft, friction members carried on said shafts respectively, non-rotating clutch-operating means surrounding said driven shaft but out of contact therewith, and clutch-releasing means carried by the driving shaft and adapted to be actuated by said non-rotating means, said operating means being supported independently of said releasing means and normally out of engagement therewith when the clutch is engaged.

7. In a clutch, the combination of a driving shaft, a friction clutch member carried thereby, a driven shaft, a friction clutch member carried by said driven shaft, spring means for forcing said members into engagement, and means for releasing said members comprising a non-rotating collar surrounding said driven shaft but out of contact therewith, a series of clutch levers, an operating collar suspended from said levers and surrounding said driven shaft, and an annular bearing between said non-rotating collar and said operating collar, the bearing surfaces being out of engagement when the clutch is engaged.

8. In a clutch, the combination of a casing member, friction devices within said member, levers having their outer ends pivoted upon said member adjacent its periphery, a collar suspended from the inner ends of said levers, means operable by said levers and extending within said casing whereby said friction devices may be released, and means for actuating said collar.

9. In a clutch, the combination of a casing, a series of springs arranged in said casing adjacent the periphery thereof, a strip bent to form a retainer and operative to space and retain said springs, a pressure ring adapted to be actuated by said springs, friction members adapted to be brought into engagement by movement of said ring, levers pivoted at their outer ends upon said casing, means carried by said levers intermediate their ends and operative to move said ring in opposition to said springs, and an operating collar suspended from the inner ends of said levers.

10. In a clutch, the combination of a shaft, friction clutch devices associated therewith, and means for actuating said devices comprising an operating collar surrounding but spaced from said shaft, clutch operating levers arranged to be actuated by said collar, said collar and levers rotatable with said clutch devices, a non-rotatable collar surrounding said shaft but spaced therefrom, and means for moving said last named collar to exert pressure upon said operating collar, there being normally no bearing contact between said rotating and non-rotating parts when the clutch is engaged.

11. In a clutch, the combination of a shaft, friction clutch devices associated therewith, and means for actuating said devices comprising an operating ring surrounding but spaced from said shaft, clutch operating levers arranged to be actuated by said ring, said ring and levers rotatable with said clutch devices, a non-rotatable collar surrounding said shaft but spaced therefrom, a bearing ring carried by said collar, the collar and ring being adjustable transversely of the shaft, and means for moving said collar and ring axially of the shaft to exert pressure upon said operating ring.

12. In a clutch the combination of driving and driven shafts, friction elements carried by said driving and driven shafts respectively and adapted to be engaged to transmit motion from one shaft to the other, and operating means for said elements comprising a rotating collar surrounding one of said shafts, a non-rotating collar adjacent to the first named collar, a bearing ring of friction reducing material carried by said non-rotating collar and engageable with said first named collar, and means for supporting said non-rotating collar out of contact with said shaft and with the bearing ring normally out of contact with the rotating collar when the clutch is engaged.

In testimony whereof I affix my signature.

OTTO E. FISHBURN.